United States Patent
Chow

(10) Patent No.: US 9,948,101 B2
(45) Date of Patent: Apr. 17, 2018

(54) PASSIVE PEAK REDUCTION SYSTEMS AND METHODS

(71) Applicant: Green Charge Networks LLC, Santa Clara, CA (US)

(72) Inventor: Bryan Chow, Brooklyn, NY (US)

(73) Assignee: GREEN CHARGE NETWORKS LLC, Santa Clara, CA (US)

( * ) Notice: Subject to any disclaimer, the term of this patent is extended or adjusted under 35 U.S.C. 154(b) by 925 days.

(21) Appl. No.: 14/323,869

(22) Filed: Jul. 3, 2014

(65) Prior Publication Data

US 2016/0006245 A1   Jan. 7, 2016

(51) Int. Cl.
*H02J 3/14*   (2006.01)
*G05B 15/02*   (2006.01)

(52) U.S. Cl.
CPC ............. *H02J 3/14* (2013.01); *Y02B 70/3225* (2013.01); *Y04S 20/222* (2013.01)

(58) Field of Classification Search
CPC ....... H02J 3/14; Y02B 70/3225; Y04S 20/222
See application file for complete search history.

(56) References Cited

U.S. PATENT DOCUMENTS

| 4,059,747 | A | 11/1977 | Brody |
| 4,731,547 | A | 3/1988 | Alenduff et al. |
| 8,078,330 | B2 | 12/2011 | Brickfield et al. |
| 8,706,650 | B2* | 4/2014 | Ozog ..................... G06Q 10/06 700/291 |
| 8,761,949 | B2* | 6/2014 | Mansfield .................. H02J 3/32 700/286 |
| 8,983,673 | B2* | 3/2015 | Chow ........................ H02J 3/14 700/297 |
| 9,312,698 | B2* | 4/2016 | Subbotin .................. H02J 3/383 |
| 9,431,827 | B2* | 8/2016 | Chow ........................ H02J 3/32 |
| 9,489,701 | B2* | 11/2016 | Emadi ..................... G06Q 50/06 |
| 2013/0134780 | A1* | 5/2013 | Parsonnet ............... H02J 3/005 307/25 |
| 2013/0190939 | A1* | 7/2013 | Lenox ....................... H02J 3/32 700/291 |
| 2013/0274935 | A1* | 10/2013 | Deshpande ............... H02J 3/28 700/291 |
| 2013/0297092 | A1 | 11/2013 | Willig et al. |
| 2013/0325197 | A1* | 12/2013 | Mansfield ................. H02J 3/32 700/291 |
| 2014/0163755 | A1* | 6/2014 | Potter ..................... H02J 3/383 700/287 |
| 2017/0102726 | A1* | 4/2017 | Goldsmith ................ G05F 1/66 |

* cited by examiner

*Primary Examiner* — M. N. Von Buhr
(74) *Attorney, Agent, or Firm* — Richard C. Galati

(57) ABSTRACT

The systems and methods disclosed herein relate to management of peak electrical demand as registered by an electrical utility meter of an electrical utility customer. The metered demand level of the customer may be monitored over a first portion of a demand charge measuring period, then a cumulative amount of energy consumed by the customer in the first portion and a projected total energy consumed during the demand charge measuring period may be calculated. Next, an offset energy amount may be determined that is the amount required to bring a net amount of energy consumed by the customer during the demand charge measuring period to lie within a target value range for the demand charge measuring period. A power source such as a battery may then be controlled to provide the offset energy amount to the customer over a second portion of the demand charge measuring period.

22 Claims, 14 Drawing Sheets

PASSIVE PEAK REDUCTION SYSTEMS AND METHODS

TECHNICAL FIELD

The following relates generally to electrical utility consumption management and specifically to systems and methods for passively reducing peak electricity power consumption of a utility consumer.

BACKGROUND

Energy costs are an increasingly important financial concern for residential, commercial, and industrial utility consumers. Due to persistently rising environmental concerns and expanding energy usage and prices, energy conservation devices and methods are in high demand. Electrical utility providers have engaged in charging customers for power at increased rates depending on whether energy consumption takes place during "peak", "mid-peak", or "off-peak" hours. Customers may also be charged based on peaks in power measured by the utility provider during billing periods. These charges are colloquially called "peak demand charges," or simply "demand charges," and they can constitute a significant portion of a utility customer's overall electrical utility bill. As technologies such as fast-charge electric vehicle (EV) charging stations, computers, HVAC systems, electric water heaters, and other high-wattage electrical consumption devices become more prevalent, demand charges have become a bigger and bigger burden on consumers.

Many customers do not even know that their utility provider is charging them for their peak demand. Those that do know have attempted to address the problem to varying, albeit limited, degrees of success. One way to manage demand charges is to use additional energy sources to supplement or offset the consumer's reliance on the utility grid. A solar panel or other generator may be used to supply extra power to the customer or may be turned on when a peak period is approaching. These solutions, however, are usually only effective at reducing the power drawn from the grid in general, thus not targeting the actual coincidence of the peak(s), or they are dependent upon the customer knowing that a peak or spike in demand is coming in advance, and that is not always possible. Some systems attempt to directly offset demand by discharging an energy source when a peak occurs, but they are usually expensive and do not have long lifespans.

As a result, there remains a need for improvements in systems and methods that manage and minimize electrical utility demand charges for consumers.

SUMMARY

According to at least one embodiment, a computer-implemented method of managing peak electricity demand registered by an electrical utility meter of an electrical utility customer is shown and described. The method may comprise monitoring a metered demand level of an electrical utility customer over a first portion of a demand charge measuring period, wherein the demand charge measuring period has a start time and an end time. Next, a cumulative first amount of energy consumed by the customer in the first portion and a projected total amount of energy consumed by the customer in the demand charge measuring period based on the metered demand level during the first portion may be calculated. An offset energy amount required to bring a net amount of energy consumed by the customer to lie within a target value range for the demand charge measuring period may be determined, with the net amount being the difference between a cumulative final amount of energy consumed and the offset energy amount. Afterward, a power source may be controlled to provide the offset energy amount to the customer over a second portion of the demand charge measuring period.

In this method, the second portion may comprise a remainder of the demand charge measuring period until the end time. The method may also include at least periodically updating the offset energy amount provided by the power source over the second portion of the demand charge measuring period, such as updating at least once per minute. Controlling the power source may comprise setting an output power of the power source to cumulatively provide the offset energy amount over the second portion. Controlling the power source may also comprise discharging an energy storage device through an inverter.

Calculating the cumulative first amount of energy consumed may comprise averaging the metered demand level over the first portion of the demand charge measuring period.

In some embodiments, if controlling the power source to provide the offset energy amount would exceed a maximum power output value, only a portion of the offset energy amount is provided to the customer over the second portion.

In some embodiments, the inverter is a grid-tie inverter and the energy storage device is a battery. A grid-tie inverter may be an inverter that converts direct current (DC) into alternating current (AC) with an ability to synchronize output with an AC utility line. The power source may also or alternatively comprise a generator.

According to another aspect of the present disclosure, a computer-implemented method of managing peak electricity demand registered by an electrical utility meter of an electrical utility customer is described. The method may include monitoring a metered demand level of an electrical utility customer over a first portion of a first demand charge measuring period, wherein the first demand charge measuring period is part of a plurality of associated demand charge measuring periods of the customer that each have a start time and an end time. With this data, the method may also calculate a cumulative amount of energy consumed by the customer in the first portion based on the metered demand level and then determine an offset energy amount required to bring a net amount of energy consumed by the customer during the first demand charge measuring period to lie within a target value range for the first demand charge measuring period. At that time, the method may include controlling a power source to provide the offset energy amount to the customer during a second demand charge measuring period of the plurality of associated demand charge measuring periods.

The associated demand charge measuring periods may be chronologically consecutive and may be used to collectively define a demand charge for the electrical utility customer. In some cases, the offset energy amount may bring a net amount of energy consumed by the customer in the plurality of associated demand charge measuring periods to lie within a target value range for a last demand charge measuring period of the plurality of associated demand charge measuring periods.

In another embodiment, a non-transitory computer-readable storage medium or computer program product may be implemented, wherein upon execution of the instructions, a processing device or computer is directed to (a) monitor a metered demand level of an electrical utility customer over a first portion of a demand charge measuring period, the demand charge measuring period having a start time and an end time; (b) calculate a cumulative first amount of energy consumed by the customer in the first portion and a projected total amount of energy consumed by the customer in the demand charge measuring period based on the metered demand level during the first portion; (c) determine an offset energy amount required to bring a net amount of energy consumed by the customer during the demand charge measuring period to lie within a target value range for the demand charge measuring period, the net amount being a difference between a cumulative final amount of energy consumed and the offset energy amount; and (d) control a power source to provide the offset energy amount to the customer over a second portion of the demand charge measuring period.

These instructions may further comprise at least periodically updating the offset energy amount provided by the power source over the second portion of the demand charge measuring period. Furthermore, calculating the cumulative first amount of energy consumed may comprise averaging the metered demand level over the first portion of the demand charge measuring period. If controlling the power source to provide the offset energy amount would exceed a maximum power output value, only a portion of the offset energy amount may be provided to the customer over the second portion.

In yet another embodiment, a non-transitory computer-readable storage medium or computer program product having instructions embedded thereon is provided. Upon execution of the instructions, a processing device or computer may be directed to monitor a metered demand level of an electrical utility customer over a first portion of a first demand charge measuring period, wherein the first demand charge measuring period may be part of a plurality of associated demand charge measuring periods of the customer, and each of the plurality of associated demand charge measuring periods may have a start time and an end time. The instructions may cause the device or computer to calculate a cumulative first amount of energy consumed by the customer in the first portion based on the metered demand level and to determine an offset energy amount required to bring a net amount of energy consumed by the customer to lie within a target value range for the first demand charge measuring period. The device or computer may then control a power source to provide the offset energy amount to the customer during a second demand charge measuring period of the plurality of associated demand charge measuring periods.

Pursuant to these instructions, the plurality of associated demand charge measuring periods may be used to collectively define a demand charge for the electrical utility customer. The offset energy amount may bring a net amount of energy consumed by the customer in the plurality of associated demand charge measuring periods to lie within a target value range for a last demand charge measuring period of the plurality of associated demand charge measuring periods.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
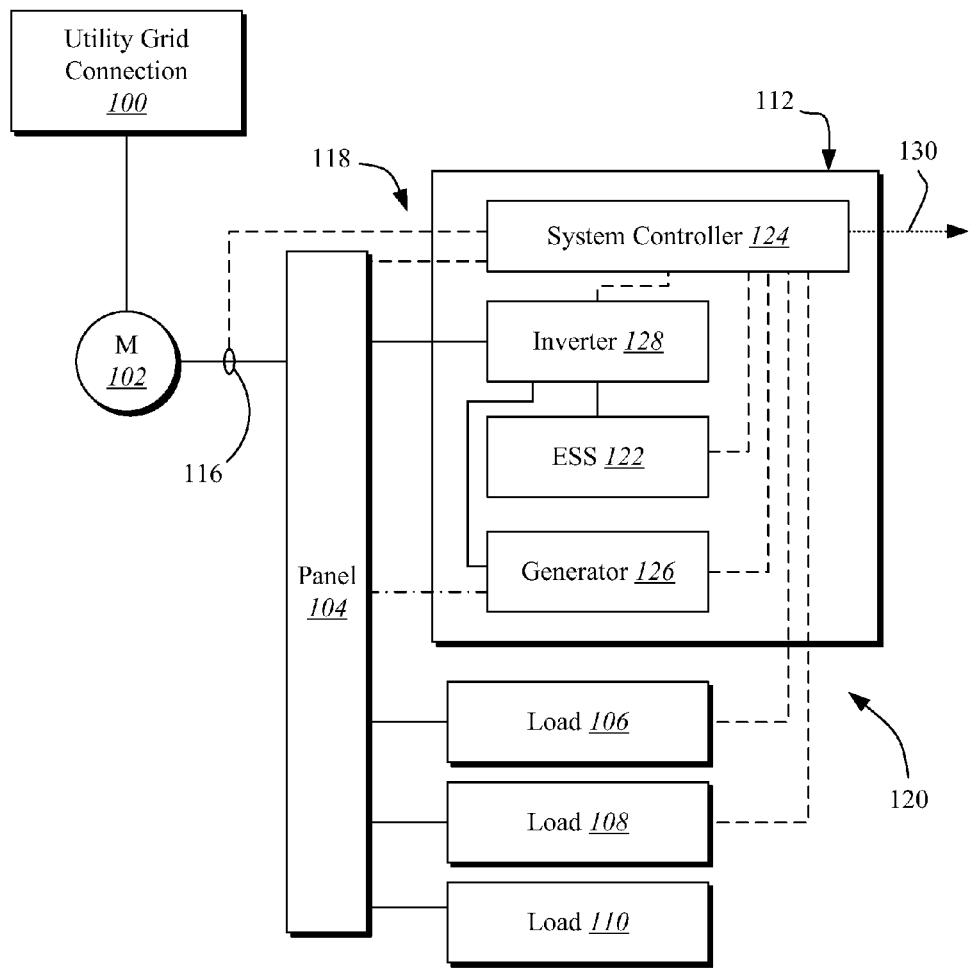
FIG. 1 is a block diagram showing an embodiment of the present systems and methods connected to a site of an electrical utility customer.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Commercial electrical utility customers are traditionally charge for the energy consumed by the facility and the peak demand of the power the facility uses during individual billing periods. The peak demand portion of the bill is measured and calculated by a utility grade interval meter. Interval meters have internal registers that measure the amount of energy consumed at the main electrical panel over one or more pre-defined time intervals. This measure of energy is then converted to an average power value by multiplying it by the fraction of an hour used as a peak billing interval. For example, with an interval of 15 minutes and an energy accumulation of 2 kilowatt hours in that window, the average power value derived from that interval is $$2 \text{ kWh}*(60 \text{ minutes}/15 \text{ minutes})=8 \text{ kW}.$$

Therefore, having a constant load of 8 kW run for 15 minutes would use the same amount of energy as a 2 kW load that runs over the whole 60 minute interval.

Utility providers generally bill peak demand based on a larger interval of time. For example, a utility provider may bill for intervals of 30 minutes of peak demand, wherein the provider averages every two 15-minute average power values (with overlaps) and keep the highest number derived from this analysis.

Many current product offerings reduce peak demand by directly mitigating excess power consumption in a 1:1 ratio. For example, a customer may desire to keep his metered peak demand level from exceeding 50 kW. When this consumption exceeds 50 kW, such as by reaching 55 kW, a command is sent to a local peak mitigation device to immediately dispatch enough energy to mitigate the peak back to the desired setpoint (e.g., 55 kW−50 kW=5 kW). In this manner, any peaks that exceed the setpoint are "canceled out" from the view of the utility provider by the power provided by the peak mitigation device. The demand actually registered by the utility meter is at or below the setpoint value (e.g., 50 kW) instead of the value of the actual peak consumption (e.g., 55 kW).

In order for this direct cancellation process to succeed in controlling the peak demand, a system controller must actively and constantly monitor the customer's net power consumption, and the system must be capable of immediate power output changes sufficient to directly and entirely mitigate the amount of the power level exceeding the setpoint. Thus, the net metered power is constantly kept at or below the setpoint through constant, evenly proportional reaction to the instantaneous power readings. Generally, this means that a generator or energy storage system (ESS) must directly provide power equal to the excess power consumption at the site for as long as the overall consumption exceeds the peak setpoint.

Rapid changes in the overall consumption, whether from constantly changing excess consumption levels or large swings or spikes in consumption, lead to heavy wear on energy sources. For example, batteries that provide the power to the consumer to offset power in excess of a peak setpoint may need to be discharged rapidly to react to a spike in consumption and then rapidly charged to be ready for the next peak. Over time, deep discharge and charge cycles or repetitive smaller charge and discharge cycles lead to deterioration of battery health.

Additionally, in order for the consumption management system to instantaneously provide power equal to the excess peak consumption, the size of an inverter (e.g., a grid-tie inverter) linking the energy source (e.g., batteries) to the customer's electrical system must have an output power capacity of at least the maximum wattage that the customer can cause to exceed the peak setpoint. When the customer's system has wide fluctuations in consumption levels (e.g., large spikes), this means that the customer's inverter must be very highly rated in order to perform its function. This also means the customer's inverter is undesirably much more expensive and larger in size than less highly rated inverters. The cost savings realized by the customer from reducing peak demand charges may not necessarily outweigh the significant up-front expense of purchasing and maintaining such a highly rated system. Furthermore, using an inverter at a higher percentage of its rating typically imparts increased efficiency when the power output is closer to the inverter's nameplate rating. For example, a 30 kW inverter operating at 20 kW will usually be more efficient (i.e., have less energy loss in conversion) than a 100 kW inverter operating at 20 kW.

According to embodiments of the present disclosure, consumption management systems may be made and used that reduce wear on batteries or other energy storage systems, reduce output requirements of inverters and other power conditioning and conversion devices, and are less intrusively sized while still providing effective peak demand charge management. Thus, the goals of the customer may be achieved more economically, and more customers may take advantage of the potential savings. Electrical utility providers may also benefit from these systems and methods by reducing peak system loads and by offsetting demand that could otherwise interfere with reliable power provision.

In some embodiments, a method of peak demand control may comprise reacting directly to the energy consumed by the customer by controlling net energy consumption, rather than reacting instantaneously to readings of the present power consumption of the customer by controlling peak power draw. If a utility provider assesses demand charges based on the average demand over one or more intervals, the average demand may be driven down by more consistent, lower-power discharge of an energy storage system that is directed to offset the average demand, rather than the instantaneous peak demand, from exceeding an average demand setpoint threshold for a demand charge measuring period.

When the average demand values of multiple demand charge measuring periods are averaged by the utility provider, the customer may also compensate for a missed target value in a first period by providing offset energy in subsequent periods. Thus, if controlling the average demand in one period is not achievable or economically prudent, the system may offset that entire period in one or more subsequent periods and a value reported to a utility provider may be prevented from exceeding a target range.

Prior to using these methods and systems, consumption management systems could easily fail to mitigate a peak occurring near the end of a demand charge measuring period. Most often, this would happen because the system either lacked enough remaining energy storage capacity to offset a late forming peak or because the inverter (or other power conditioning) in a system lacked capacity to manage a spike in consumption as it occurred. Using the present systems and methods, however, late forming peaks may be mitigated in overlapping or subsequent demand charge measuring periods, so energy storage systems may recharge, cool, or otherwise be prepared before their output is necessary. Additionally, peaks that exceed the capacity of inverters or other power conditioning can still have their effect on the peak demand charge negated since the energy (i.e., not power) consumed is controlled and monitored instead of only instantaneous power draw. As a result, consumption management systems may be less expensive and difficult to use, since they may not have to be designed around offsetting unexpected spikes that occur in worst case scenarios.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring now to the figures in detail, FIG. 1 shows a schematic block circuit diagram illustrating components of an embodiment of the present disclosure. At a site, a utility distribution grid connection 100 may provide electric power service to the site through a service meter 102 to a service panel 104. Loads 106, 108, 110 may be directly connected to the service panel 104 along with a consumption management system (CMS) 112. The CMS may be configured to measure current coming from the grid connection 100 at a current measurement point 116, and that reading and a voltage reading from the service panel 104 are both sent to the CMS 112. Some or all of the loads 106, 108, 110 may have their energy consumption measured or detected by the CMS 112 (as shown by the dashed lines 118 to the system controller 124). This system may be used in many types of consumption management processes, such as, for example, load shedding, energy storage-assisted load shedding, peak demand detection, demand mitigation, power conditioning, and other related processes.

The utility distribution grid connection 100 may include a source of electrical energy such as, for example, an electrical connection to an electrical power plant or generator system. The utility provider may charge the site operator according to the energy drawn from the grid connection 100 at the site or by another method such as by a monthly service charge or similar non-proportional charge. Preferably, the source charges the site operator based on their maximum demand during a billing period as a "demand charge" that can be mitigated by use of a CMS 112.

The utility meter 102 tracks the consumption of energy by the customer's site when it draws energy from the grid connection 100. For example, it may track the kilowatt-hours drawn from the grid connection 100 to loads 106, 108, 110 or the service panel 104 at the site, and may be used to determine the total energy from the grid that is used at the site. As used herein, the "metered demand" or "metered consumption" of the site may be defined as the power drawn by the utility customer as detected by the utility provider. Typically, this means that the metered demand is the net demand of the total demand of the loads (e.g., loads 106, 108, 110) minus the total demand reduced by discharge of the energy storage system and/or generator at the site. Because the metered demand is the value that is used by utility providers to assess demand charges, controlling and monitoring this value may be a beneficial function of the system controller 124.

The service panel 104 may be connected to the utility meter 102 and distributes the grid connection 100 to loads 106, 108, 110 or to subpanels that redistribute the electrical connection throughout the site. The service panel 104 may be connected to the utility meter 102 and may be accessible or measureable by a CMS 112 to obtain current and voltage readings 118 for the entire site or a portion of the site. The power line between the utility meter 102 and the main service panel 104 may also be configured for taking a current measurement 116 to obtain the current presently drawn to the site from the utility distribution grid 100. Other features, options, and components of a service panel 104 will be apparent to those skilled in the art having the benefit of this disclosure.

The loads 106, 108, 110 may include loads connected to the service panel 104 or to the CMS 112. The loads 106, 108, 110 may be appliances, commercial electrical units, HVAC systems, other user loads, and/or combinations thereof. The loads 106, 108, 110 may also include any variety of electricity-consuming devices that, when connected to the electrical system of the site on the customer side of the service meter 102, draw energy that is charged to the site operator by the utility grid operator. Loads 106, 108, 110 may periodically become inactive, thereby not drawing power from the grid connection 100, or may sometimes discharge energy into the grid connection 100 or other portions of the site. Loads may be connected to the service panel 104 such as loads 106, 108, and 110, or may be connected to the CMS 112 directly. Either way, the loads may draw electrical energy to operate. If a load is connected through the CMS 112, the CMS 112 may also have the ability to control the amount of power made available to the load and may control whether power is transferred to the load at all.

Loads 106, 108 may be monitored by the CMS 112, as shown by the dashed lines 120 in FIG. 1. The CMS 112 may be able to issue instructions to some loads, and other loads may not be able to receive instructions from the CMS 112.

The number of loads may vary, and some loads may not be monitored or measured by the CMS 112. The loads represented herein are merely representative of various loads that may be connected at the site and at the CMS 112, and should not be interpreted as restrictive of the number or nature of the loads connected in the system according to the invention. The number of loads connected at the site may be any positive integer without departing from the spirit of the invention. Each of these loads may be connected to the CMS 112, to the service panel 104, or to some other point in the site, and may have differing types and rates of energy consumption and communication (e.g., energy consumption measurements 120) with the CMS 112. It may be preferable to directly connect some loads to the CMS 112 for certain forms of consumption management, and it may be preferable to connect some loads to the service panel 104 or other connections in the site for other forms of consumption management.

In some embodiments, the consumption management system (CMS) 112 may include an energy storage system and an electronic controller. It may also include generators, renewable energy generation devices, transmitters, and other electronics. The CMS 112 may monitor the energy consumption of a site, such as by taking current and voltage readings 118, and discharge energy into the site when energy consumed at the site presently or prospectively exceeds a limit. For instance, the CMS 112 may discharge when a rise or peak in energy consumption would result in the site incurring additional demand charges. A site may include one or more CMSs 112 to manage demand from different points in the site, or for operational redundancy in cases of emergency.

The current measurement 116 may include information about current (e.g., amperage) entering the site from a utility distribution grid connection 100 or entering the site from another portion of the site. A current measurement 116 may be taken using a current transformer (CT), ammeter, or other means for measuring and detecting current in electronics. The current and voltage readings 118 may include information such as amperage taken from a current measurement 116 and voltage information such as the total voltage at the service panel that is provided to the connected loads (e.g., 106, 108, and 110) and CMS 112. The current and voltage readings 118 may provide sufficient information to the CMS 112 to calculate the total power draw of the overall site or some portion of the site. This total power draw may be different from the actual power consumed at the site because the CMS 112 may supply energy to the service panel 104, thereby reducing the consumption measured at the utility meter 102 or current measurement 116. With the information from the current and voltage readings 118, the CMS 112 may determine when demand of the site would exceed a peak demand and result in a demand charge.

The internal components of an example of a consumption management system (CMS) 112 are shown, including at least one energy storage system (ESS) 122 and at least one system controller 124, and, optionally, at least one energy generation device 126 and an inverter 128. The system controller 124 may be accessed by a network connection 130. The ESS 122 is shown connected to the inverter 128 to be able discharge toward the utility grid connection 100 and to recharge via the power supplied by the utility grid connection 100. Thus, the inverter 128 may be a grid-tie bi-directional inverter or an inverter capable of AC-to-DC conversion and vice versa. The system controller 124 is wired and configured to control the status of the ESS 122 and to receive information about the status of the ESS 122.

The generator 126 is connected in the same fashion as the energy storage 122 to the inverter 128 and the system controller 124 so that it can discharge energy to the panel 104, and so the controller 124 can monitor the generator's 126 status and control its operation. A network connection 130 may connect to the system controller to receive and transmit information through a network. Current and voltage measurements 118 and energy consumption measurements 120 may be read by the system controller 124, but it is not necessary that all consumption information is directly detected by the controller 124, as seen by the isolated connection of load 110. In some cases, the generator 126 may be directly connected to the panel 104, as indicated by the dashed link between the generator 126 and panel 104 in FIG. 1.

The energy storage system 122 may include batteries, capacitors, fuel cells, flywheels, other energy storing apparatus, and combinations thereof. The inverter 128 may comprise electrical components such as DC-DC converters or inverters to enable the energy storage system 122 to interface with the service panel 104 or other portions of the site or CMS 112. Energy storage system 122 may include one unit or more than one unit. It may be advantageous to have a large energy storage system 122 in order to mitigate demand spikes for a long period of time. However, according to some embodiments of the invention, the energy storage capacity may be reduced to a point where the energy storage is approximately small enough to provide energy sufficient to offset the energy consumed by the customer so that the average energy consumed over a demand charge measuring period lies within a target value range.

The system controller 124 may include a processor and associated memory of a computer that has inputs and outputs. The controller 124 may have the ability to monitor the activity of connected loads (e.g., loads 106, 108), energy storage system 122, energy generation 126, and/or the service panel 104 using devices such as current and voltage sensors at those loads and other assets, and it may interface with other components if necessary. The controller 124 may be a digital signal controller and may have power connections to route power to a load (e.g., 114), and may interface with a network connection 130. The controller may also have an associated memory for permanent or semi-permanent storage of consumption data of the loads and other parts of the site. Thus, the controller 124 may comprise a computing device configured to monitor demand levels, calculate energy consumed by the customer, and control a power source to provide energy to the customer.

In some embodiments the generator 126 may be present in the system to supplement the energy storage system 122 in providing energy to the site. The energy generation device 126 may include, for example, solar or other photovoltaic panels, wind generators, fuel-based generators, fuel cells, thermoelectric generation, other generating devices, and combinations thereof.

In some embodiments a network connection 130 to the system controller may include, for example, a radio frequency transceiver, a wired connection, or other link to a network. A network may include, for example, an intranet or internet of multiple computers, servers, controllers, and combinations thereof. The network connection 130 may allow the consumption management system 112 to send and/or receive instructions and information from external devices, such as to link multiple consumption management systems 112 to a server that monitors and records energy usage at multiple sites in an area or that may issue discharge commands to the consumption management systems 112 to push energy into the distribution grid where the consumption management systems 112 are located. A network connection 130 may include an antenna for communications via, for example, Wi-Fi, radio, cellular, wireless broadband, Bluetooth®, Zigbee®, other communication standards, and combinations thereof, including those with wired communication capability.

The isolated connection to load 110 indicated in this figure shows that a load may be connected at the site (e.g., to the service panel 104) in some embodiments such that it is not directly measured by a consumption management system 112. The consumption of an isolated load 110 may be determined by a consumption management system 112 by taking current and voltage readings 118 and comparing the power drawn by the site as a whole to the power used by loads that the controller 124 may read, such as loads 106 and 108, then subtracting those loads from the total power used at the site. An isolated load 110 may not be subject to load shedding by the controller 124, or may require external means to shed its electrical consumption.

Embodiments such as those pictured in FIG. 1 may be advantageous in that the loads 106, 108, and 110 may be independently monitored, regulated, shed, and mitigated. This may be used where variable load shedding is implemented to cause load shedding to produce a desired actual consumption curve. For example, this may be advantageous in an embodiment where an inverter with a limited rate of energy transfer is used to connect the energy storage of the in the CMS 112 to the site. In this embodiment loads may be shed to keep the actual consumption from exceeding the maximum consumption threshold beyond the inverter's capability to transfer power to mitigate a peak with the energy storage.

Using the system shown in FIG. 1, the utility consumption of a site may be monitored and passively controlled. Elements of the system controller 124 may include the modules of FIG. 2.

Figure 2:
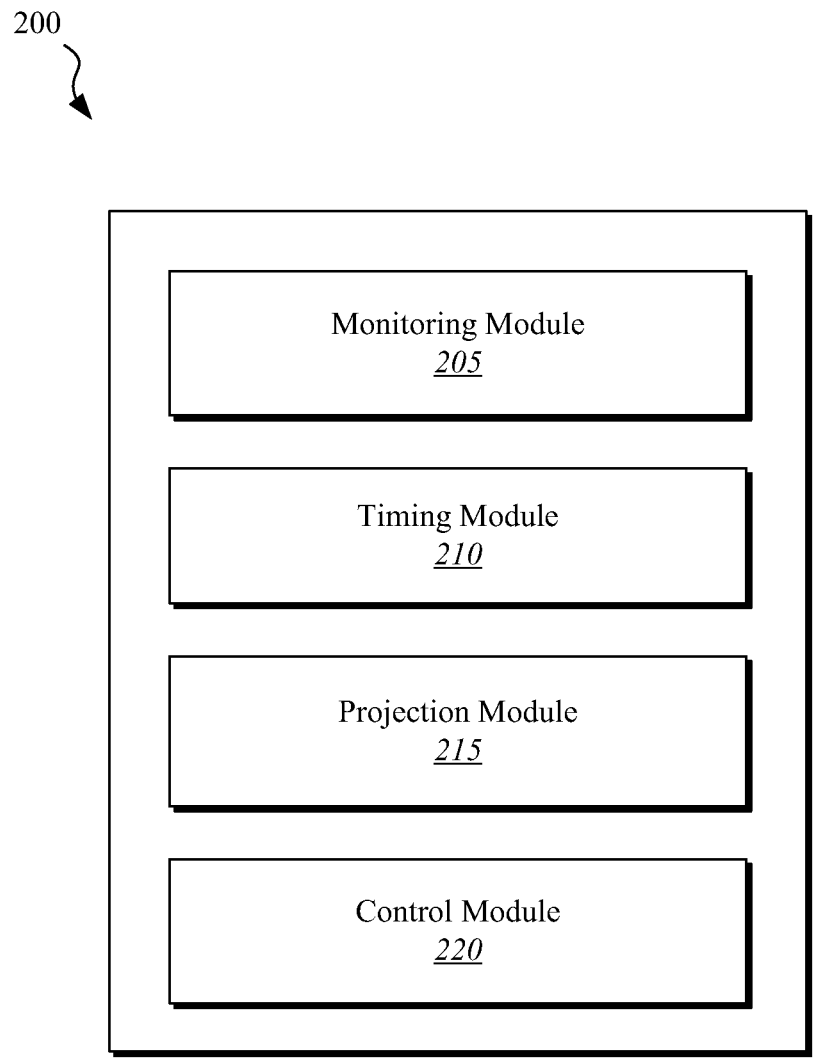
FIG. 2 is a block diagram showing an example of a consumption management module according to an embodiment of the present disclosure.

FIG. 2 shows an embodiment of a consumption management module 200 according to an embodiment of the present disclosure. The consumption management module 200 may be encoded in instructions such as instructions embedded on a non-transitory computer-readable medium executed by a system controller, such as system controller 124. The consumption management module 200 may comprise a plurality of modules to perform related tasks. In some embodiments, the consumption management module 200 may comprise a monitoring module 205, a timing module 210, a projection module 215, and a control module 220. The consumption management module 200 may be embodied as a non-transitory computer-readable storage medium used to operate a system controller to control peak demand of a customer using a consumption management system.

The monitoring module 205 may be configured to poll and receive information from sensors and other electronic equipment at the site. For example, the monitoring module may gather information from sensors 116 and signals 118, 120 shown in FIG. 1. The monitoring module may thus monitor the metered consumption of the site (as determinable by current and voltage readings 118) and the overall consumption of the site. In this case, the "overall consumption" of the site may refer to the total energy consumption of the site. This may include all energy drawn from the utility grid in the absence of any demand mitigation systems, or it may include the gross amount of energy consumed by the site (i.e., before mitigation is taken into account).

By monitoring the overall and metered consumption values for the site, the monitoring module may provide information regarding how much of the overall consumption is being metered and measured by the utility provider. The monitoring module 205 may therefore be used to track whether the overall consumption and/or the metered consumption of the site meets or exceeds a demand setpoint. The projection and control modules 215, 220 may use the information gathered by the monitoring module 205 to manage a response of the consumption management module 200 in conditions that are likely to lead to an increased demand charge.

The timing module 210 may be configured to track the chronological position of present demand information relative to a utility provider-based demand charge measuring period. Thus, the timing module 210 may be used to determine the time since the start of a demand charge measuring period, the time remaining in a demand charge measuring period, whether a demand charge measuring period is part of a plurality of associated demand charge measuring periods, whether and how long these associated demand charge measuring periods overlap, and other related timing functions. In conjunction with the monitoring module 205, the timing module 210 may beneficially be used to calculate average energy consumed over the course of a demand charge measuring period. In some cases, the timing module 210 may also be beneficial in calculating a projection of the energy consumed at the site over a demand charge measuring period in conjunction with the projection module 215. The timing module 210 may obtain timing via an external source, such as a network connection or from manual input of a time value by a user, or the module 210 may track time independently. The start and end times of a demand charge measuring period, as used by the timing module 210, may be provided to the user by the utility provider or may be independently calculated based on historical data and historical demand charges assessed to the customer. For example, if the information about demand charge measuring period start and end times are not provided by a utility provider, the timing module 210 may independently estimate start and end times by identifying where peak consumption took place in historical data and deducing a window of a demand charge measuring period from the position of the peak and the power level of the peak as assessed by the utility provider.

The projection module 215 may be configured to receive information from the monitoring module 205 and timing module 210. The projection module 215 may use information about recent energy consumption and the length of time that consumption takes place in a demand charge measuring period (or multiple demand charge measuring periods) to calculate the cumulative amount of energy consumed by the site. The projection module 215 may then determine an offset energy amount that, if provided to the site for the remainder of the demand charge measuring period, would be sufficient to drive the net amount of energy consumed by the site to lie at or below the target setpoint for that period. The projection module 215 may also take into account historical data, weather data, schedules, and other information regarding past and future consumption of the site. This information may be used to project upcoming peak demand levels and use this information to correspondingly adjust the offset energy amount if upcoming demand is expected to be higher or lower than recent demand.

By determining the offset energy amount, the consumption management module 200 may implement an energy storage control plan that may more accurately keep average demand over a demand charge measuring period within a desired range of target peak values. In some embodiments, the projected offset energy amount required may exceed the capacity of an energy storage system 122, generator 126, and/or inverter 128 to mitigate. In such situations, the projection may be used to project a new setpoint range and to configure the consumption management system 112 to minimize the impact of consumption to a maximum extent. For example, the system 112 may initiate load shedding to minimize the demand that would exceed the amount mitigated by discharging the energy storage system 122 and generator 126.

The control module 220 may be configured to generate or receive instructions regarding how to provide the offset energy amount to the customer's site during one or more demand charge measuring period. The control module 220 may therefore interface with other components of the consumption management system 112, such as an energy storage system 122, generator 126, and inverter 128, to implement the plan to offset the cumulative energy amount drawn by the customer in a demand charge measuring period and thereby reduce the average peak demand registered by the meter.

One reason that the consumption management module 200 may be beneficial is that it may operate without necessarily having to actively, immediately, and proportionally react to fluctuations in demand that exceed the peak demand threshold setpoint. If the overall consumption of the site exceeds the setpoint, the consumption management module 200 may respond over time, driving down the average consumption in the demand charge measuring period rather than driving down the instantaneous demand occurring while it occurs. For these reasons, an inverter (e.g., inverter 128) and energy sources (e.g., energy storage system 122 and generator 126) that are part of the consumption management system 112 may not need to be designed with specifications intended to offset potential large magnitude demand peaks within a short amount of time. Instead, they may be configured for more prolonged discharge based on the average overall consumption that exceeds a peak setpoint. Thus, these systems may be beneficial where the customer experiences erratic load peaks or spikes that would otherwise need to be detected and managed immediately. This may also beneficially reduce battery wear due to there being little need for fast, deep discharge and charge cycles.

Additionally, using the power conversion devices less erratically may cause less stress on component parts of the devices. Sporadic high power discharges or charges may cause internal components to heat and cool, and fast heat cycles may increase the wear on hardware associated with the power conversion devices, such as, for example, insulated gate bipolar transistors (IGBTs), printed circuit board (PCB) components, and relays.

Figure 3:
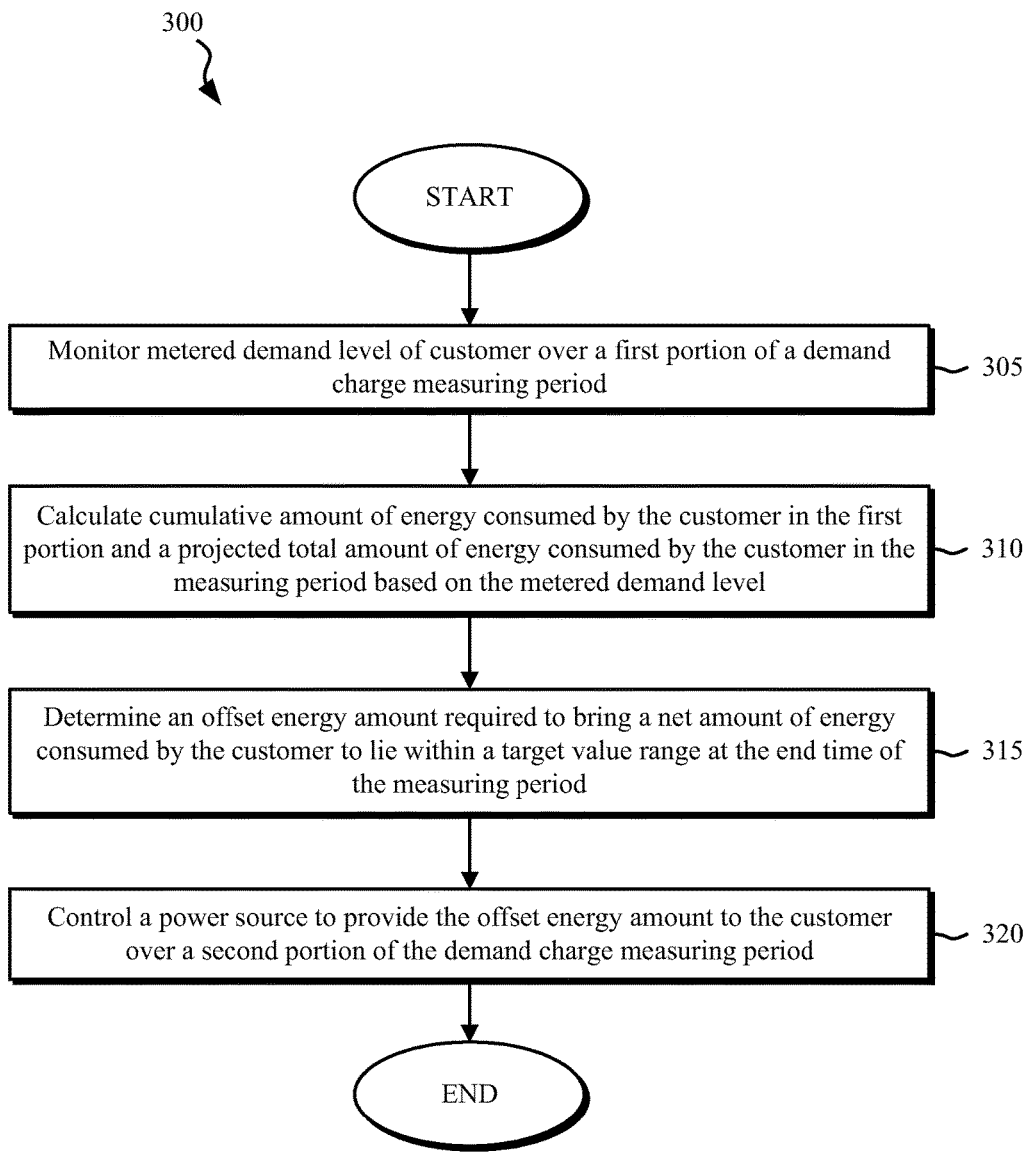
FIG. 3 is a flowchart of a process that may be used to manage an average demand level of a site according to an embodiment of the present disclosure.

FIG. 3 illustrates an example process 300 by which a consumption management module (e.g., module 200) may be implemented. The process 300 may be a software-based process implemented by a computer, as further discussed below. At block 305, the metered demand level of a customer is monitored over a first portion of a demand charge measuring period. The portion may be a matter of seconds, or in some embodiments may be a longer or shorter period. Typically, the metered demand level is monitored at least once per minute. The demand level may be monitored by a management system (e.g., a system controller 124 or monitoring module 205).

Figure 4:
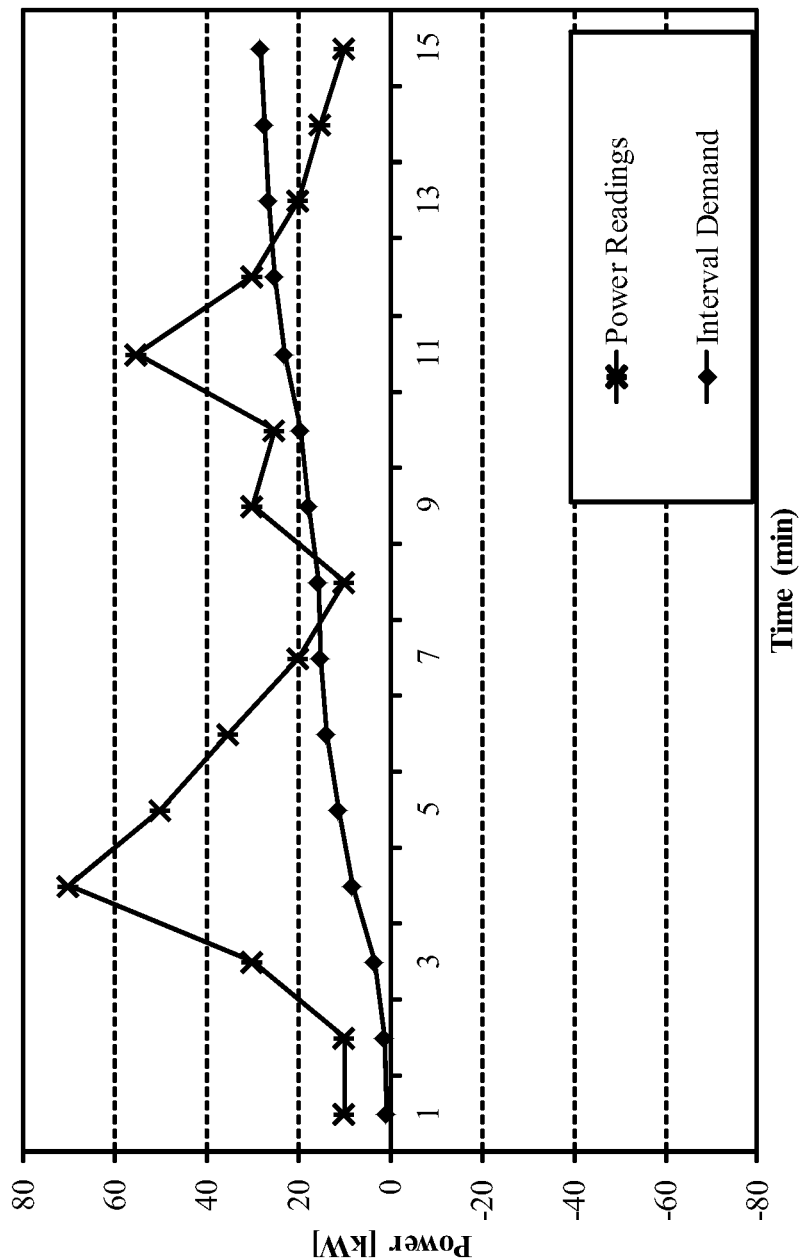
FIG. 4 shows a chart of power readings taken over a demand charge measuring interval.

As shown in FIG. 4, a system may track power readings (i.e., the metered demand level) of an electrical system over the course of a demand charge measuring period. In this example, the demand charge measuring period is 15 minutes long. The monitored demand level may vary from minute to minute, second to second, or other intervals of time based on instantaneous power usage. Here, the power readings range from 10 kilowatts (kW) (e.g., at the end of minute 1) to 70 kW (e.g., at the end of minute 4) and may change erratically or according to a pattern or schedule. Thus, the metered demand level may be monitored at the end of each minute in this example, and the first portion of the demand charge measuring period may comprise the elapsed time during the demand charge measuring interval in question.

As consumption continues over the span of the interval, the interval's average demand may be monitored and tracked. The interval demand is the rolling-average monitored demand level over the course of the interval. After the first minute, the 15-minute average interval demand is only about 0.66 kW (~10 kW in the first minute/15 minutes), but by the end of 15 minutes, the 15-minute average steadily increases to about 28 kW. Thus, without a consumption management system, a demand charge would be assessed for this period based on an average metered demand of 28 kW.

Figure 5:
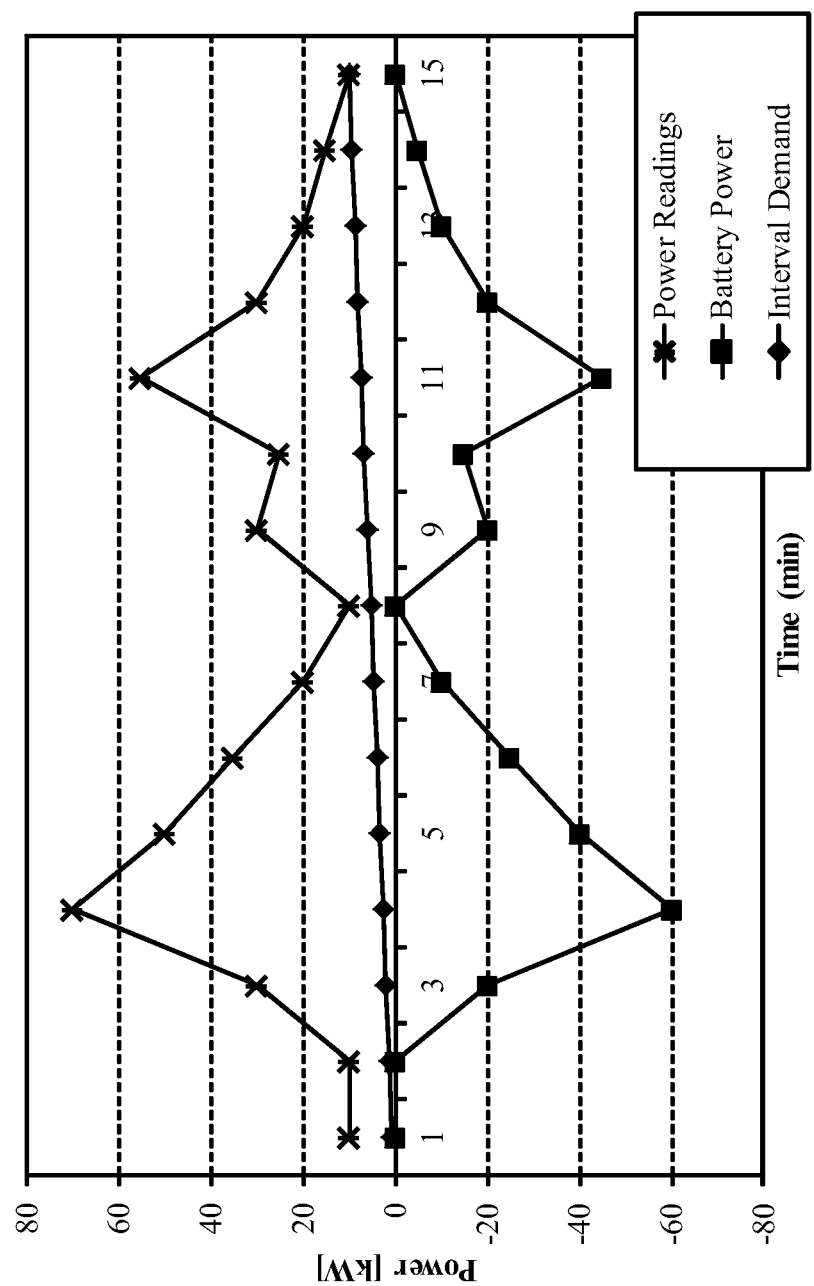
FIG. 5 shows a chart of power readings and battery power levels used to mitigate demand charges of the power levels of FIG. 4 according to a conventional system.

FIG. 5 shows how a conventional consumption management system would mitigate the metered demand in a situation such as that shown in FIG. 4. Specifically, as shown by the battery power of FIG. 5, a conventional system would trigger discharge of the battery and thereby offset at least some of the consumption of the site when the power readings exceed a predetermined setpoint value. In this case, the setpoint value is 10 kW, so the battery (or other energy storage or generator) is discharged to provide power to the site at the power level in excess of 10 kW. For example, when the power readings are measured at an instantaneous level of 70 kW, the battery output is 60 kW. The high power levels required to substantially match peaks exceeding the setpoint frequently put strain on the battery and power conversion and conditioning systems used at the site. In this example, the inverter connecting the battery to the site would need a rating of at least 60 kW to be capable of mitigating the demand charges that would be assessed against this customer. Assuming such a system is at the site, as shown in FIG. 5, the final average interval demand level only reaches 10 kW, so demand charges are reduced by 18 kW worth of peak power. A setpoint may change from interval to interval, especially when the setpoint is exceeded by an average demand over an interval.

Figure 6:
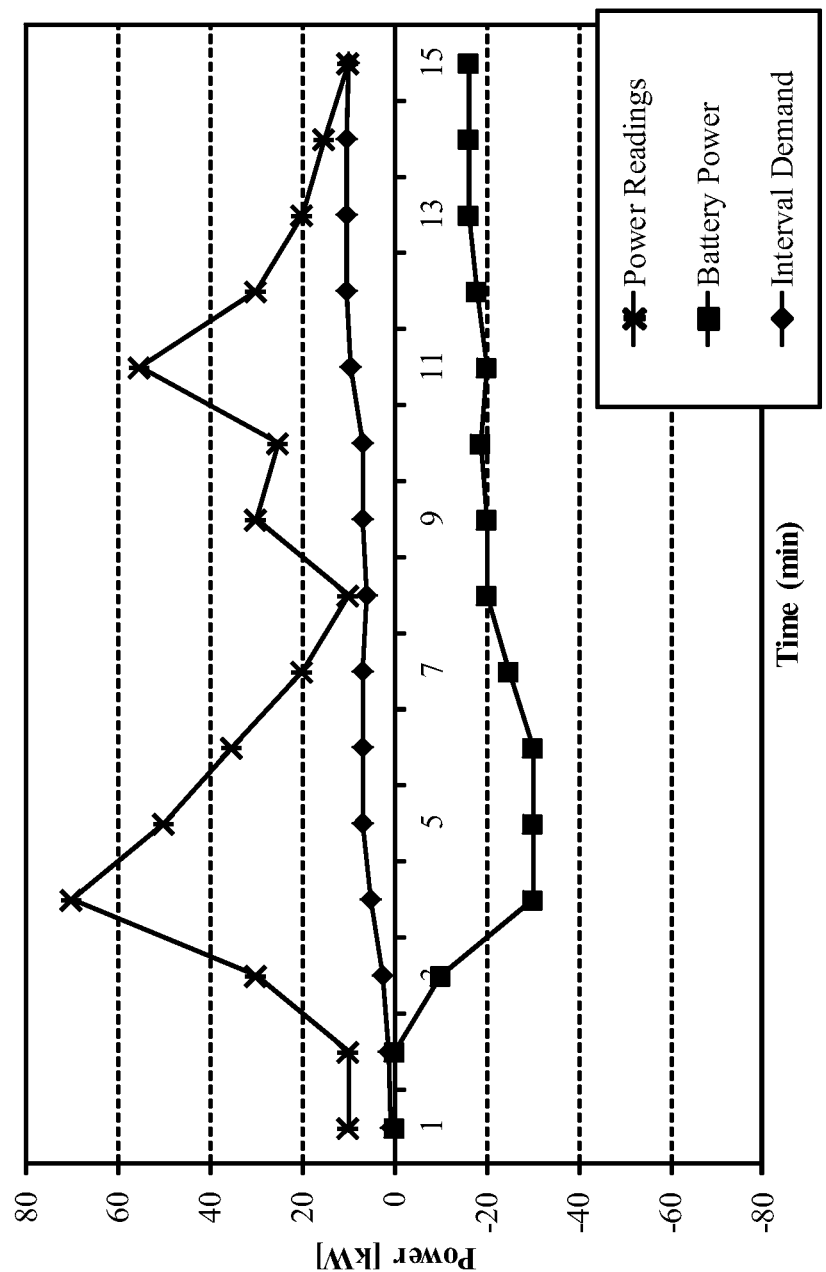
FIG. 6 shows a chart of power readings and battery power levels used to mitigate demand charges according to an embodiment of the present disclosure.

FIG. 6 shows an example power reading and battery power output chart according to the present disclosure. Note that although the power readings and final average demand value are identical in FIGS. 5 and 6, but the maximum battery power is significantly lower magnitude due to implementation of the process 300 of FIG. 3.

Referring again to FIG. 3, with the first portion of the demand charge measuring period monitored in block 305, the system may calculate a cumulative amount of energy consumed by the consumer in that first portion of the demand charge measuring period and a projected total amount of energy consumed by the customer in the measuring period in block 310. The cumulative amount of energy consumed may be calculated by comparing the monitored power levels to the time elapsed, and simply finding the energy consumed over time at those power levels. The projected total amount of energy consumed in the measuring period may be a value based on recent power levels, historical power levels, information about consumption that is gathered from other comparable electrical systems, or other related sources. For example, the projected total amount may be a linear extrapolation of the rate of change of the average consumption over the first portion of the measuring period, or may be a model modified by peaks known to occur under previously-recorded or known circumstances, such as at certain times of day or days of the year.

The performance of blocks 305 and 310 may be continuous as the demand charge measuring period progresses. For this reason, the projected total may have decreased error as time progresses and more information about the metered demand level of the customer is gathered over time.

In block 315, an offset energy amount required to bring a net amount of energy consumed by the customer is determined. This offset energy may be defined as the amount of energy required to offset the total energy consumption at the end of the measuring interval so that it lies at a target value range at the end time. For example, the target value range may be a setpoint, such as a target value at or below a specified number. In the example of FIG. 6, the target value range is 10 kW or less. Thus, as time progresses in the demand charge measuring period, the system may track the overall amount of energy consumed by the customer and the offset amount of energy which would bring the net average demand of the site to 10 kW or less, if the offset energy is supplied to the site over the remaining portion of the measuring period.

In FIG. 6, this behavior is modeled as the time interval progresses. At the end of minutes 1 and 2, no power readings have exceeded 10 kW, so no offset energy would be required to keep the average demand at or below the setpoint of 10 kW at the end of the 15-minute interval. Following minute 2, however, the power readings exceed the setpoint and the system determines that the average demand at the end of the interval will be higher than the setpoint. Therefore, the battery is discharged by an amount projected to be required to offset the overall average energy at minute 15, assuming the projected final energy value matches the consumption measured up to that point. Because the system is not managing instantaneous power consumption, but is instead proactively spreading mitigation activity over the remainder of the measuring interval, the rate of battery discharge is significantly lower than in the conventional example of FIG. 5.

Furthermore, while the system of FIG. 5 is greatly benefited by taking a large number of quick measurements (e.g., measurements every second), the system of FIG. 6 may produce the same results with fewer measurements and slower requirements for "reaction times" during the interval. Note that at the end of 15 minutes, the average demand is still at 10 kW, but the peak magnitude of battery discharge is only 30 kW instead of 60 kW. Thus, the inverter requirements for discharging a battery under this system are lower than the requirements for the conventional system of FIG. 5. The rate of battery discharge is also more stable, which may improve battery life and reliability of the system.

Turning back to FIG. 3, once the offset energy amount is known, the system may control a power source (e.g., battery or generator) to provide the offset energy amount to the customer over a second portion of the demand charge measuring period, as shown in block 320. The second portion may be the remainder of the demand charge measuring period, as mentioned above, or a portion of the remainder, such as over the next minute of the demand charge measuring period, at which point a new offset energy amount may be assessed and implemented. In FIG. 6, for example, as a peak in the power readings subsides, the battery power may be reduced (e.g., at minutes 7 and 8) to reflect that less offset energy is likely to be needed to keep the net energy at the end of the interval within the target range.

In some cases, extremely high demand measurements may be monitored, and the amount of energy required to be supplied to the site over the remaining time in a demand charge measuring interval may be too high for the power source to provide in that time. This is most likely to occur when a large peak forms late in the measuring interval when there is little time to offset the energy or when the power source is already discharging and unable to take on significant additional load. Thus, if controlling the power source to provide the offset energy amount would exceed the maximum power output value of the management system, only a portion of the offset energy amount may be provided to the customer over the second portion of the measuring interval. This way, the peak may be mitigated to the extent possible by the management system and the impact on demand charge measuring values may be minimized. Further, if the system allows the average to exceed the setpoint or other target range in this manner, a new, higher setpoint may be established (at least temporarily) so that the system does not attempt to force the average demand to reach a target range that would no longer provide a demand charge-reducing benefit. When a new setpoint is likely to occur, the system may also proactively shed load if it is possible to prevent a new demand peak that way. For example, some loads may be shed for a few minutes at a time under certain circumstances, such as refrigerators or HVAC systems, and turning these off at opportune times may prevent new demand charges from forming in conjunction with the discharge of energy sources in the CMS.

Figure 7:
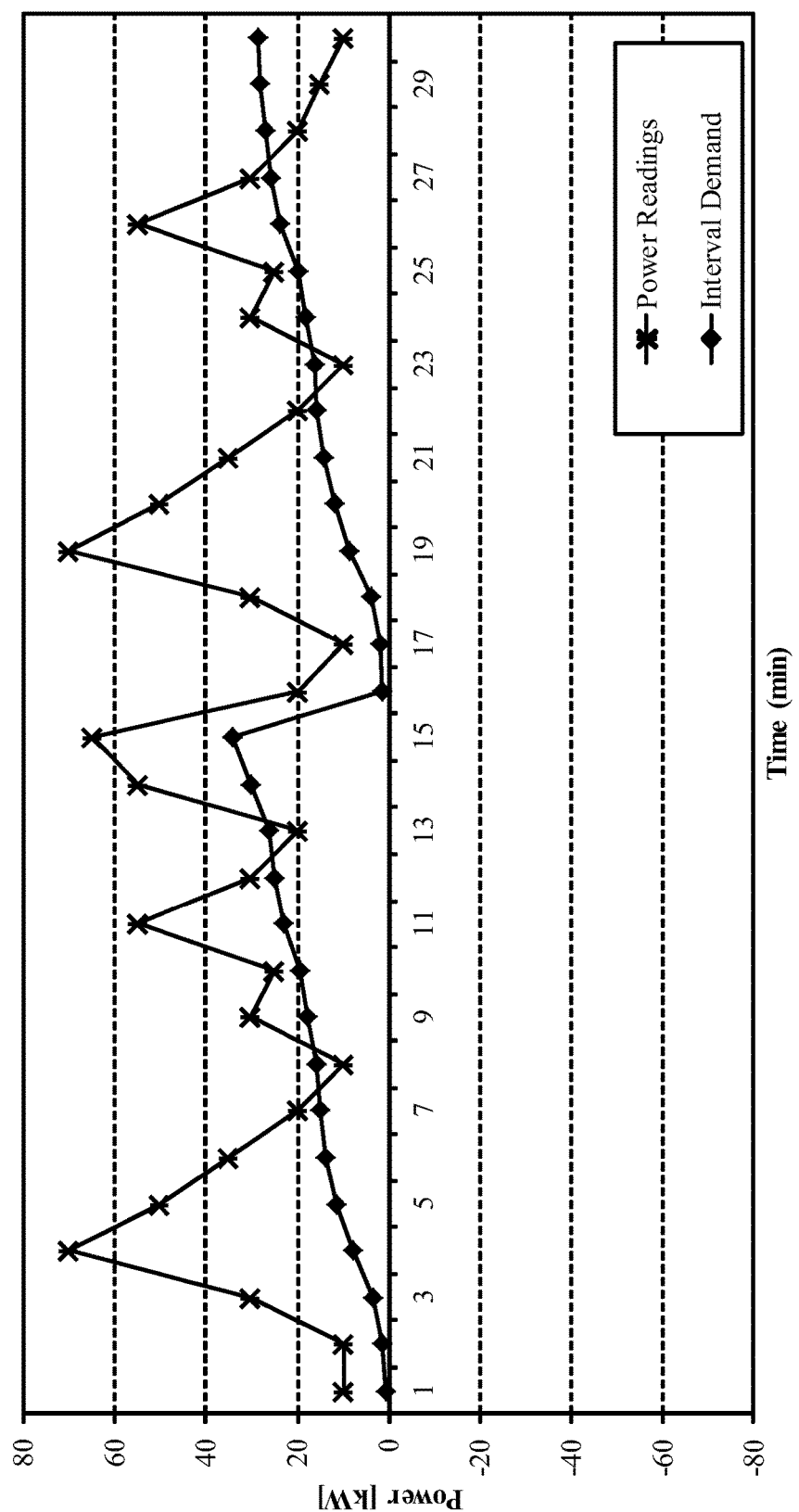
FIG. 7 shows a chart of power readings taken over two demand charge measuring intervals.

Some of the challenges associated with later-forming peaks in a measuring period may be managed more easily if the utility provider averages the average demand of multiple periods to obtain a final value on which a demand charge is assessed. FIG. 7 is a chart of power readings over two consecutive demand charge measuring intervals. Each interval corresponds with minutes 0 through 15 and minutes 15 through 30, respectively. Overall power consumption may be monitored and recorded over each interval, as in process 300. Here, the interval demand increases until reaching final values of 34.33 kW at the end of the first interval and 28.66 kW at the end of the second interval. Between intervals, the interval demand resets, since the average demand is tracked for each interval. At the conclusion of the intervals, the utility provider would assess a demand charge for the customer based on the average of these two final interval demand values, so in this case, the demand charge would be based on 31.5 kW consumption for the entire 30 minutes.

Figure 8:
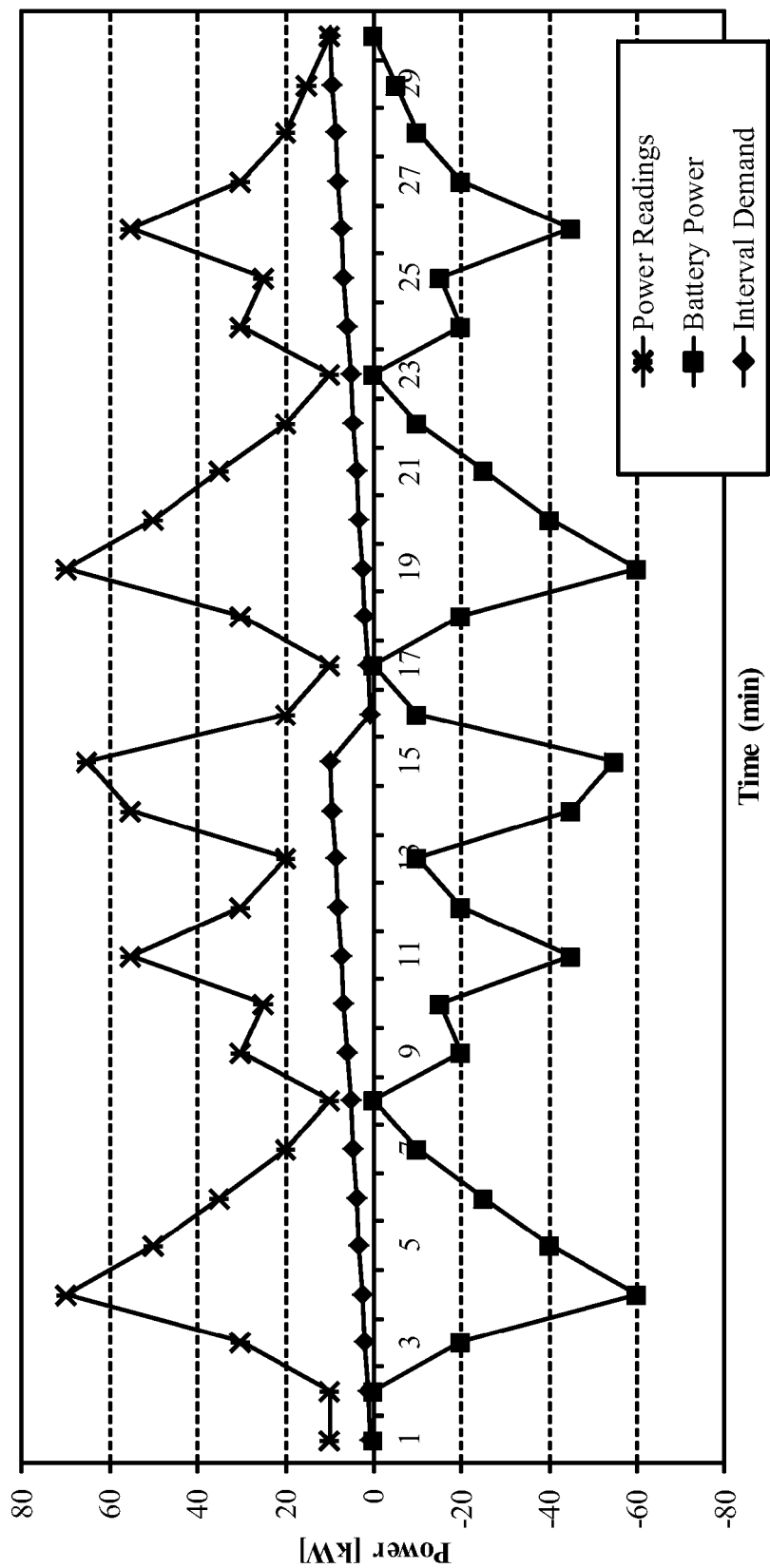
FIG. 8 shows a chart of power readings and battery power levels used to mitigate demand charges of the power levels of FIG. 7 according to a conventional system.

Once again, as shown in FIG. 8, a conventional consumption management system could prevent the interval demand from management system was highly rated, up to at least 60 kW, and the battery is discharged at rates that quickly change from minute to minute. Thus, the conventional system has many of the same drawbacks in this situation as in the situation described in connection with FIG. 5. Due to instantaneous demand offsetting, the peak occurring over minutes 14 to 15 in the intervals is not problematic for this system.

Figure 9:
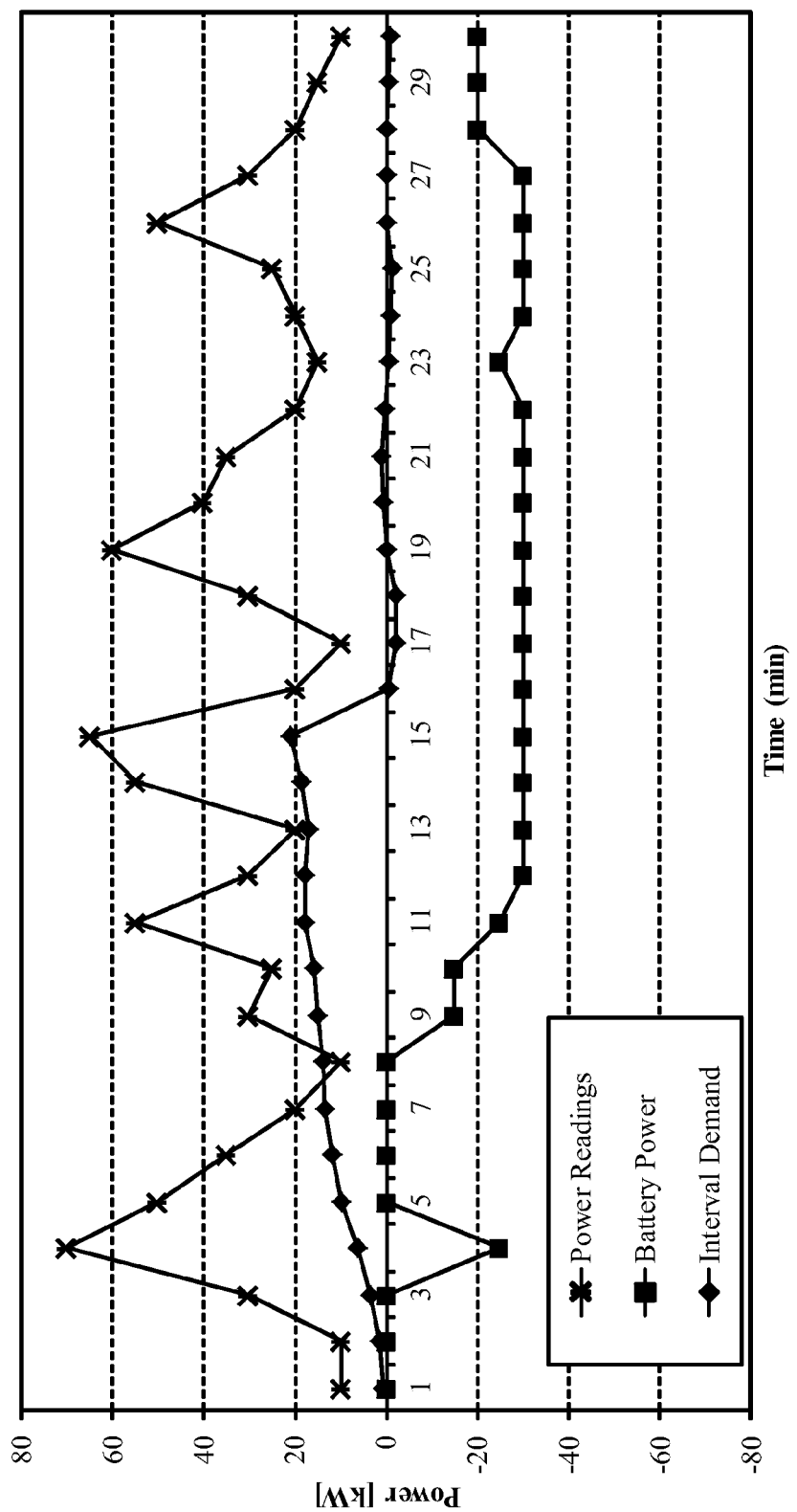
FIG. 9 shows a chart of power readings and battery power levels used to mitigate demand charges of the power levels of FIG. 7 according to an embodiment of the present disclosure.

FIG. 9 shows a system that mitigates demand charges using an embodiment of the present disclosure. When the power readings reach a peak near the end of a demand charge measuring period, such as over the last two minutes of the first period in FIGS. 7-9, the consumption management system may be unable to discharge the battery quickly enough to offset the amount of energy needed to mitigate the demand charges to reach the target value before time runs out in the period and an average demand value is recorded by the utility provider. To compensate for this potential issue, in some embodiments a consumption management system may be implemented wherein if the target value is not reached during a specific demand charge measuring period, the average demand of a subsequent period may be mitigated to such a level that the average of the missed target average and the subsequent period's average is still within the target range.

As shown in FIG. 9, although the interval demand average reaches 21 kW at the end of the 15 minute first interval, which exceeds the setpoint of 10 kW, the battery is discharged even more than would otherwise be necessary over minutes 16 through 30 so that the interval demand average of the second period is −1 kW. Thus, when the average of these two values is obtained by the utility provider, it is at the setpoint of 10 kW even though the setpoint was exceeded by the first average interval demand value.

Using the method illustrated by FIG. 9, the demand charges for the site may be managed as effectively as the conventional system of FIG. 8, but the rating of the system may be considerably lower and less demanding, as shown by the peak battery power magnitude not exceeding 30 kW across the entire 30 minutes in FIG. 9.

While two intervals are shown in the illustration of FIGS. 7-9, additional intervals of various lengths and divisions may be implemented by a utility provider that may be addressed in the same way as FIG. 9, as will be apparent to those having ordinary skill in the art and having the benefit of this disclosure. Thus, for example, three intervals or more could be used by the utility provider to determine the demand charge, and the system in that case may mitigate the first interval over the second and third interval, and/or the second interval over the third interval. In this way, the offset energy amount determined at the end of the first period may be provided during a second (or third) demand charge measuring period of the associated demand charge measuring periods.

Figure 10:
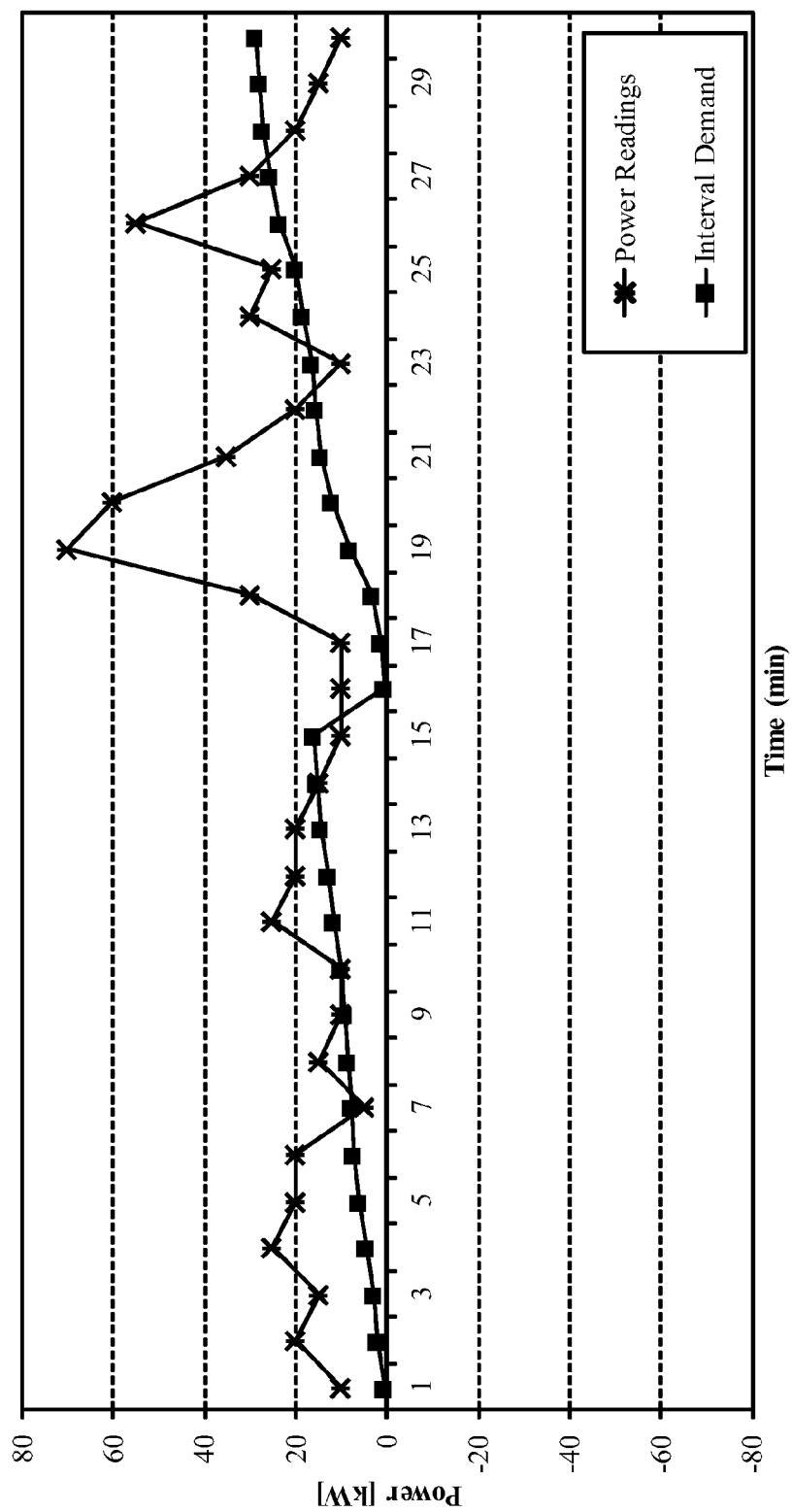
FIG. 10 shows a chart of power readings taken over two consecutive demand charge measuring intervals.

FIG. 10 provides another example of a peak demand mitigation scenario where a large peak in demand occurs in a latter period of a set of associated demand charge measuring intervals. In this example, there are two periods, with the first extending from zero to fifteen minutes, and the second extending from sixteen to thirty minutes. The first interval does not have peaks as large as the second interval. Without a consumption management system, at the end of the first interval, the demand charge would be based on an average demand of 16 kW, and at the end of the second interval, the average demand would be 28.66 kW.

Figure 11:
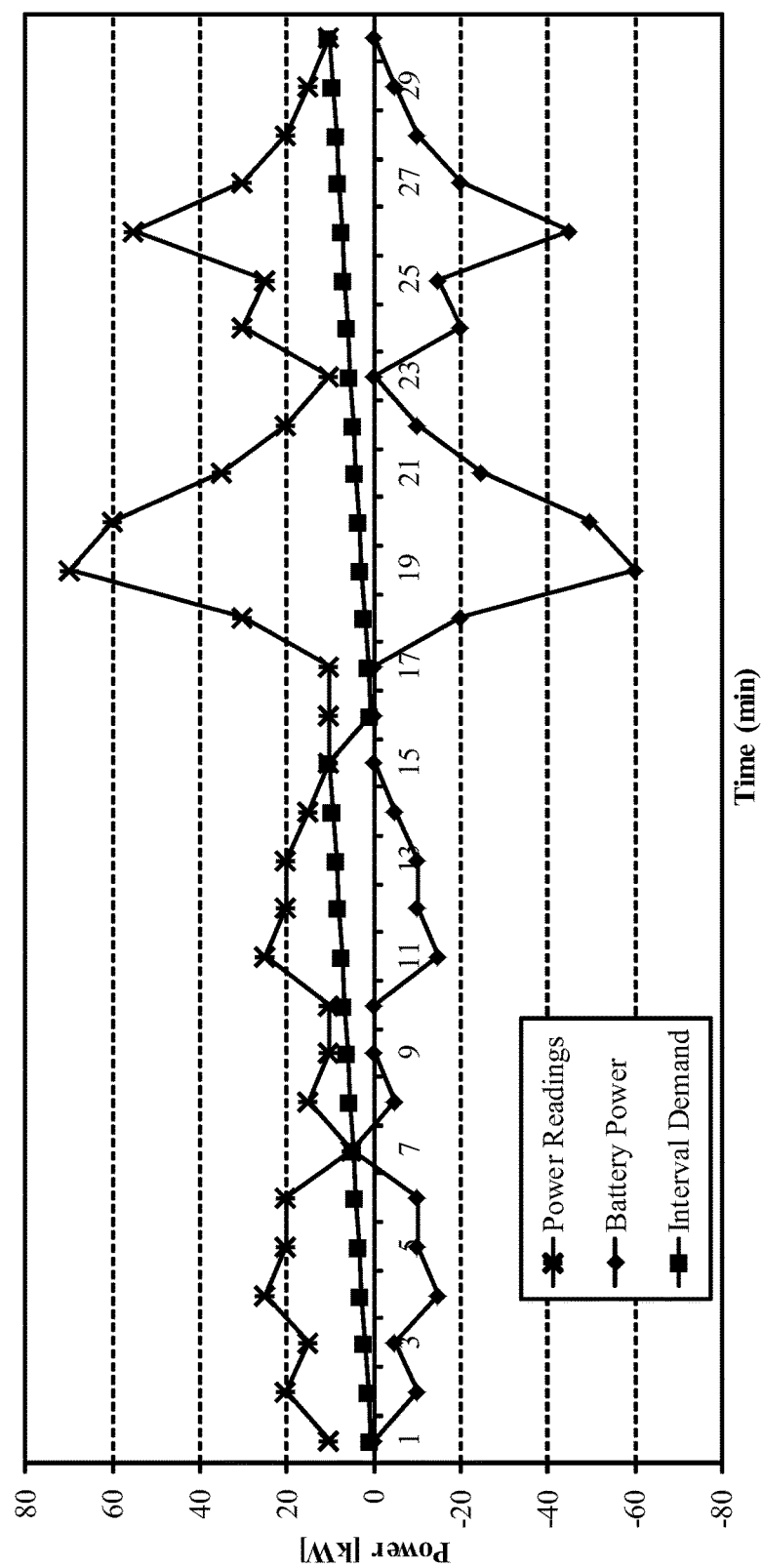
FIG. 11 shows a chart of power readings and battery power levels used to mitigate demand charges of the power levels of FIG. 10 according to a conventional system.
Figure 12:
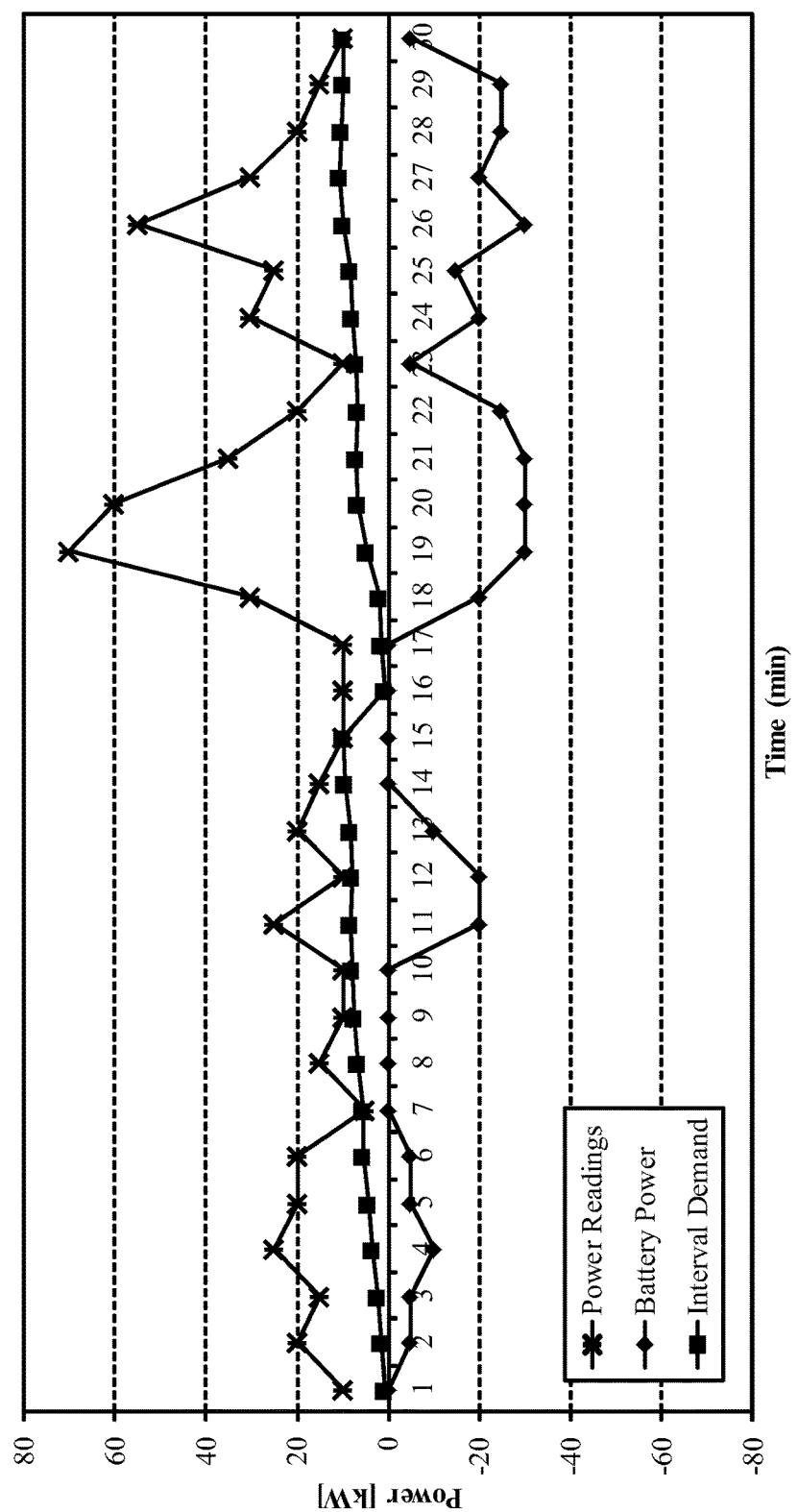
FIG. 12 shows a chart of power readings and battery power levels used to mitigate demand charges of the power levels of FIG. 10 according to an embodiment of the present disclosure.

FIG. 11 shows how a conventional system would mitigate the demand charge in this scenario, similar to FIGS. 5 and 8. The average demand would be mitigated to read 10 kW at the end of each separate interval. Using embodiments of the present disclosure, demand charges may be mitigated in the manner shown in FIG. 11, but without high battery power levels. In the case shown in FIG. 12, the peak magnitude of the battery power is only 30 kW as compared to the peak of 60 kW in FIG. 11. However, the average demand at the end of each interval may be mitigated to 10 kW. In some embodiments, if the peaks in the second interval are anticipated or projected to be much larger than the peaks in the first interval, the system may also preemptively mitigate the consumption of the second interval with mitigation in the first interval. This way, high consumption in the second interval is prevented from causing the averaged demand averages for the intervals to exceed the target range of values (i.e., the setpoint value).

Figure 13:
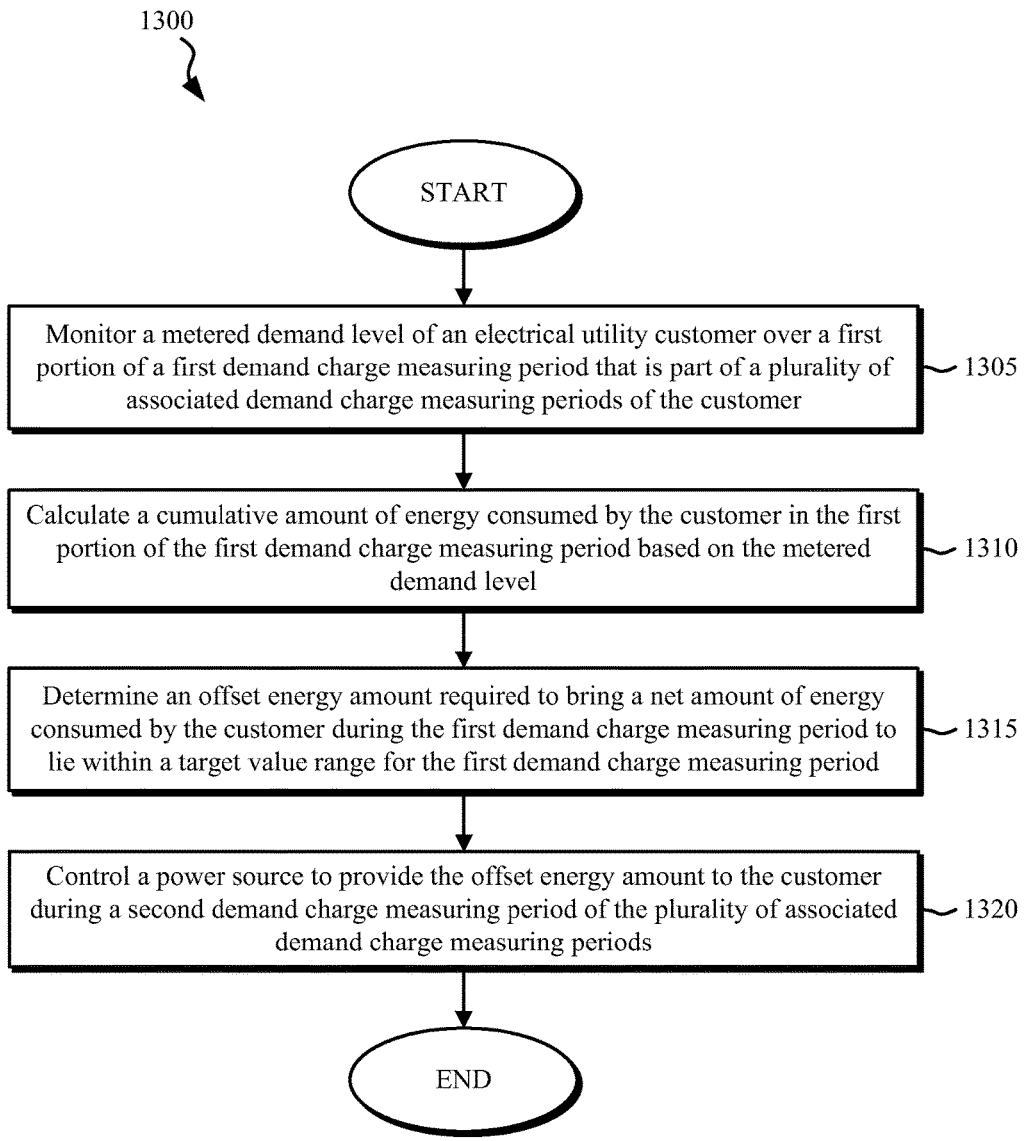
FIG. 13 is a flowchart of a process that may be used to manage an average demand level of a site according to an embodiment of the present disclosure.

FIG. 13 shows an example of the process 1300 that may be used to manage averages of the average demand values of multiple demand charge measuring periods. This process 1300 may be a process implemented as described above in connection with FIGS. 9 and 12 wherein average demand levels of multiple demand charge measuring periods are averaged. The process 1300 may be computer implemented.

The process 1300 may include block 1305, wherein a metered demand level of an electrical utility customer over a first portion of a first demand charge measuring period is monitored. The first demand charge measuring period may be part of a plurality of associated demand charge measuring periods of the customer that each have a start time and an end time. This monitoring may be performed as discussed above in connection with block 305.

With this monitoring data, the process 1300 in block 1310 may calculate a cumulative amount of energy consumed by the customer in the first portion based on the metered demand level and then, in block 1315, determine an offset energy amount required to bring a net amount of energy consumed by the customer during the first demand charge measuring period to lie within a target value range for the first demand charge measuring period. At that time, the process 1300 may include block 1320, which may include controlling a power source to provide the offset energy amount to the customer during a second demand charge measuring period of the plurality of associated demand charge measuring periods. In this manner, the average demand of a first demand charge measuring period may be affected by the average demand of another demand charge measuring period, and the average of those two averages may be maintained to lie within the target range, even if one of the averages would not otherwise lie in the target range.

Figure 14:
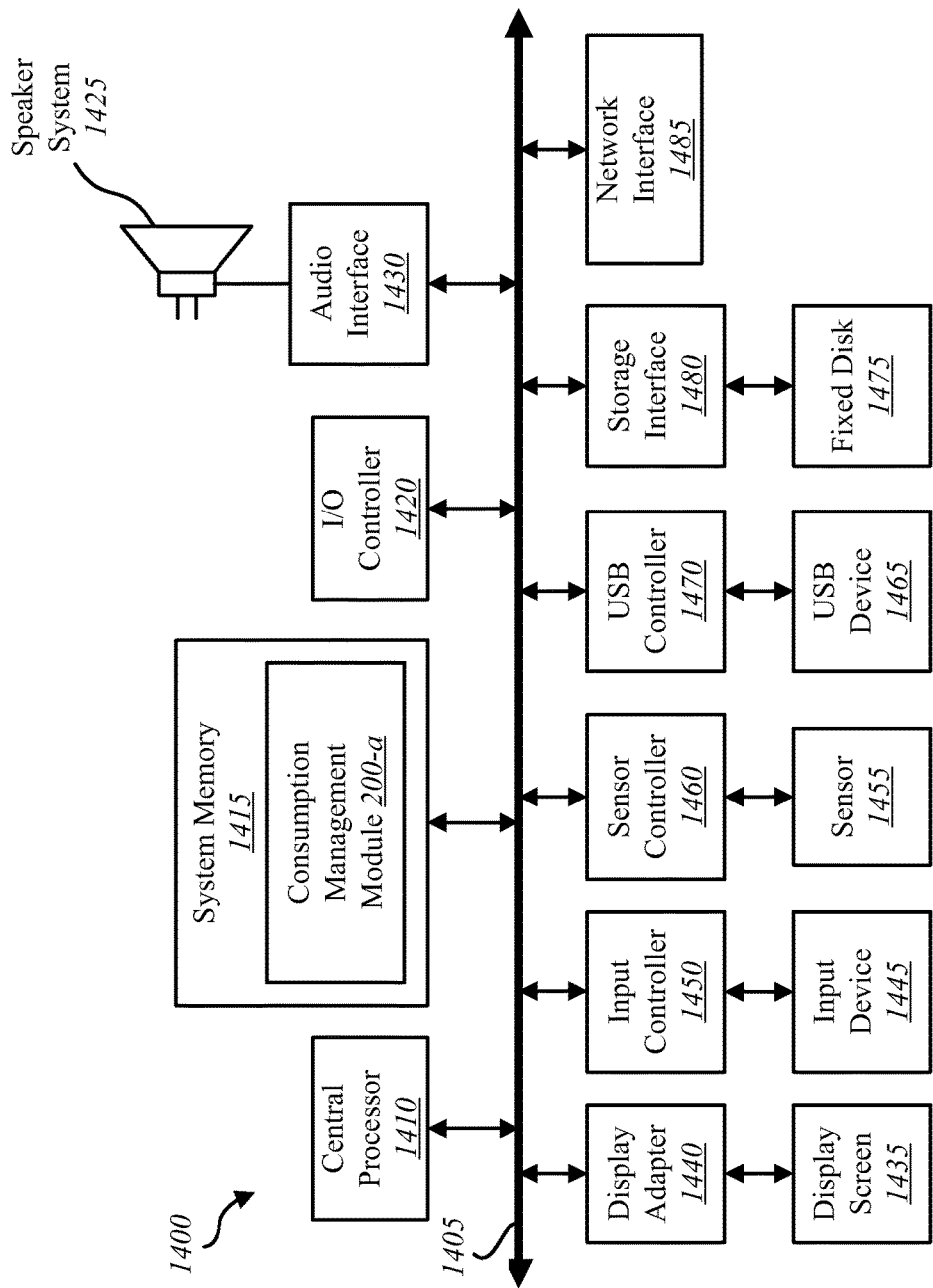
FIG. 14 is a block diagram of a computer system that may be used as part of the present systems and methods.

FIG. 14 depicts a block diagram of a computer system 1400 suitable for implementing the present systems and methods. Computer system 1400 includes a bus 1405 which interconnects major subsystems of computer system 1400, such as a central processor 1410, a system memory 1415 (typically RAM, but which may also include ROM, flash RAM, or the like), an input/output controller 1420, an external audio device, such as a speaker system 1425 via an audio output interface 1430, an external device, such as a display screen 1435 via display adapter 1440, an input device 1445 (interfaced with an input controller 1450), a sensor 1455 via a sensor controller 1460, one or more universal serial bus (USB) device 1465 (interfaced with a USB controller 1470), and a storage interface 1480 linking to a fixed disk 1475. A network interface 1485 (coupled directly to bus 1405) may also be included.

The input/output controller 1420 may comprise communication buses and ports used to communicate with external devices (e.g., inverters or batteries). For example, in some embodiments the input/output controller 1420 may include RS232 and RS485 serial communication buses or ports to communicate with one or more inverters via Modbus or comparable protocols. Similarly, a controller area network (CAN) bus may be implemented as part of the input/output controller 1420 to communicate with battery systems via CAN or similar protocols.

Bus 1405 allows data communication between central processor 1410 and system memory 1415, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a consumption management module 200-a which may implement the present systems and methods may be stored within the system memory 1415. The consumption management module 200-a may be a consumption management module 200 disclosed herein. The consumption management module 200-a may provide instructions to the processor 1410 to control devices linked to I/O controller 1420 such as battery control devices and inverter control devices. Applications resident with computer system 1400 are generally stored on and accessed via a non-transitory computer readable medium, such as a hard disk drive (e.g., fixed disk 1475), an optical drive (e.g., an optical drive that is part of a USB device 1465 or that connects to storage interface 1480), or other storage medium. Additionally, applications can be in the form of electronic signals modulated in accordance with the application and data communication technology when accessed via network interface 1485.

Storage interface 1480, as with the other storage interfaces of computer system 1400, can connect to a standard computer readable medium for storage and/or retrieval of information, such as a fixed disk 1475. Fixed disk 1475 may be a part of computer system 1400 or may be separate and accessed through other interface systems. A modem connected to the network interface 1485 may provide a direct connection to a remote server via a telephone link or to the Internet via an internet service provider (ISP). Network interface 1485 may provide a direct connection to a remote server via a direct network link to the Internet via a POP (point of presence). Network interface 1485 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 14 need not be present to practice the present systems and methods. The devices and subsystems can be interconnected in different ways from that shown in FIG. 14. The operation of a computer system such as that shown in FIG. 14 is readily known in the art and is not discussed in detail in this application. Code to implement the present disclosure can be stored in a non-transitory computer-readable medium such as one or more of system memory 1415, or fixed disk 1475 (e.g., optical disk or solid state flash memory). The operating system provided on computer system 1400 may be MS-DOS®, MS-WINDOWS®, OS/2®, UNIX®, Linux®, or another known operating system.

Moreover, regarding the signals and network communications described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiments are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A computer-implemented method of managing average electricity demand registered by an electrical utility meter of an electrical utility customer, the method comprising:
   monitoring an initial amount of energy consumed by an electrical utility customer over a first portion of a demand charge measuring period;
   calculating a projected remaining amount of energy consumed by the customer over a remaining portion of the demand charge measuring period, wherein a projected total amount of energy consumed by the customer in the demand charge measuring period is equal to the initial amount of energy plus the remaining amount of energy;
   determining an offset energy amount required to bring a metered average demand of the customer during the demand charge measuring period to lie within a target value range when the offset energy amount is provided during the remaining portion, the metered average demand being a difference between the projected total amount of energy and the offset energy amount;
   controlling a power source to provide the offset energy amount to the customer over the remaining portion of the demand charge measuring period.

2. The method of claim 1, wherein the remaining portion comprises a remainder of the demand charge measuring period from an end of the first portion until an end of the demand charge measuring period.

3. The method of claim 1, further comprising at least periodically updating the offset energy amount provided by the power source over the remaining portion of the demand charge measuring period.

4. The method of claim 3, wherein the offset energy amount is updated at least once per minute.

5. The method of claim 1, wherein controlling the power source comprises setting an output power of the power source to cumulatively provide the offset energy amount over the remaining portion.

6. The method of claim 1, wherein monitoring the initial amount of energy consumed comprises averaging a metered demand level of the electrically utility customer over the first portion of the demand charge measuring period.

7. The method of claim 1, wherein if controlling the power source to provide the offset energy amount would exceed a maximum power output value, only a portion of the offset energy amount is provided to the customer over the remaining portion.

8. The method of claim 1, wherein controlling the power source comprises discharging an energy storage device through an inverter.

9. The method of claim 8, wherein the inverter is a grid-tie inverter and the energy storage device is a battery.

10. The method of claim 1, wherein controlling the power source comprises providing power from a generator.

11. A non-transitory computer-readable storage medium having instructions embedded thereon, wherein upon execution of the instructions, a processing device or computer is directed to:
   monitor an initial amount of energy consumed by an electrical utility customer over a first portion of a demand charge measuring period;
   calculate a projected remaining amount of energy consumed by the customer over a remaining portion of the demand charge measuring period, wherein a projected total amount of energy consumed by the customer in the demand charge measuring period is equal to the initial amount of energy plus the remaining amount of energy;
   determine an offset energy amount required to bring a metered average demand of the customer during the demand charge measuring period to lie within a target value range when the offset energy amount is provided during the remaining portion, the metered average demand being a difference between the projected total amount of energy and the offset energy amount;
   control a power source to provide the offset energy amount to the customer over the remaining portion of the demand charge measuring period.

12. The storage medium of claim 11, wherein the instructions further comprise at least periodically updating the offset energy amount provided by the power source over the remaining portion of the demand charge measuring period.

13. The storage medium of claim 11, wherein calculating the projected remaining amount of energy consumed comprises averaging a metered demand level of the electrical utility customer over the first portion of the demand charge measuring period.

14. The storage medium of claim 11, wherein if controlling the power source to provide the offset energy amount would exceed a maximum power output value, only a portion of the offset energy amount is provided to the customer over the remaining portion.

15. A computer-implemented method of managing peak electricity demand registered by an electrical utility meter of an electrical utility customer, the method comprising:
    monitoring a metered demand level of an electrical utility customer over a first portion of a first demand charge measuring period, the first demand charge measuring period being part of a plurality of associated demand charge measuring periods of the customer, each of the plurality of associated demand charge measuring periods having a start time and an end time;
    calculating a cumulative amount of energy consumed by the customer in the first portion based on the metered demand level;
    determining an offset energy amount required to bring a net amount of energy consumed by the customer during the first demand charge measuring period to lie within a target value range for the first demand charge measuring period;
    controlling a power source to provide the offset energy amount to the customer during a second demand charge measuring period of the plurality of associated demand charge measuring periods.

16. The method of claim 15, wherein the plurality of associated demand charge measuring periods are chronologically consecutive.

17. The method of claim 15, wherein the plurality of associated demand charge measuring periods are used to collectively define a demand charge for the electrical utility customer.

18. The method of claim 17, wherein the offset energy amount brings the net amount of energy consumed by the customer in the plurality of associated demand charge measuring periods to lie within a target value range for a last demand charge measuring period of the plurality of associated demand charge measuring periods.

19. The method of claim 15, wherein the start and end times of the plurality of associated demand charge measuring periods are defined by a utility provider.

20. A non-transitory computer-readable storage medium having instructions embedded thereon, wherein upon execution of the instructions, a processing device or computer is directed to:
    monitor a metered demand level of an electrical utility customer over a first portion of a first demand charge measuring period, the first demand charge measuring period being part of a plurality of associated demand charge measuring periods of the customer, each of the plurality of associated demand charge measuring periods having a start time and an end time;
    calculate a cumulative amount of energy consumed by the customer in the first portion based on the metered demand level;
    determine an offset energy amount required to bring a net amount of energy consumed by the customer during the first demand charge measuring period to lie within a target value range for the first demand charge measuring period;
    control a power source to provide the offset energy amount to the customer during a second demand charge measuring period of the plurality of associated demand charge measuring periods.

21. The storage medium of claim 20, wherein the plurality of associated demand charge measuring periods are used to collectively define a demand charge for the electrical utility customer.

22. The storage medium of claim 20, wherein the offset energy amount brings the net amount of energy consumed by the customer in the plurality of associated demand charge measuring periods to lie within a target value range for a last demand charge measuring period of the plurality of associated demand charge measuring periods.

* * * * *